M. A. FORSTER.
FAUCET.
APPLICATION FILED AUG. 5, 1913.
1,164,600.
Patented Dec. 14, 1915.
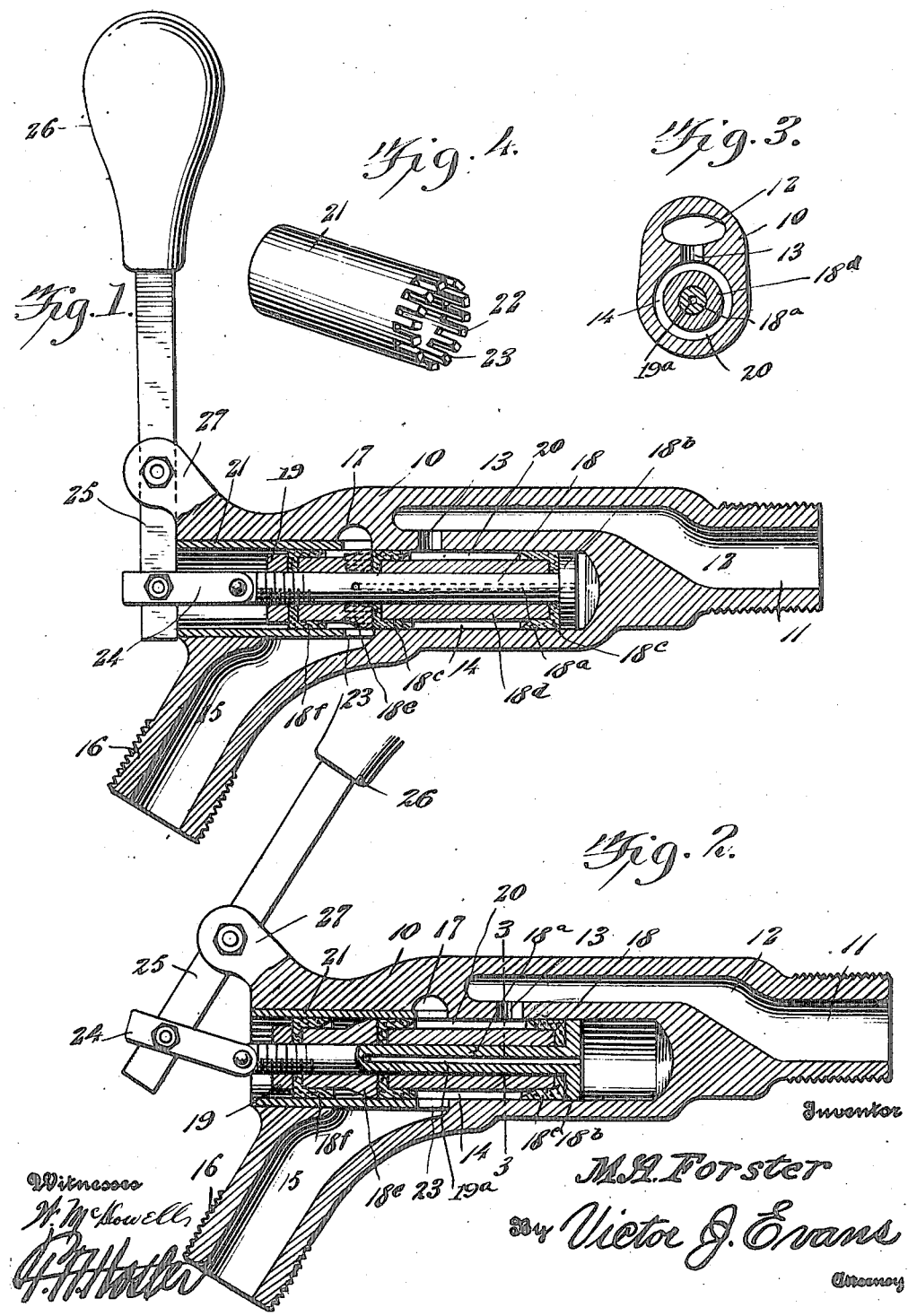
Inventor
M. A. Forster
By Victor J. Evans
Attorney
Witnesses

UNITED STATES PATENT OFFICE.

MARTIN A. FORSTER, OF ALTOONA, PENNSYLVANIA.

FAUCET.

1,164,600.	Specification of Letters Patent.	Patented Dec. 14, 1915.

Application filed August 5, 1913. Serial No. 783,150.

*To all whom it may concern:*

Be it known that I, MARTIN A. FORSTER, a citizen of the United States, residing at Altoona, in the county of Blair and State of Pennsylvania, have invented new and useful Improvements in Faucets, of which the following is a specification.

The invention relates to faucets, and has for an object to provide a faucet of a simple and durable construction for controlling the flow of fluid from a pipe on which the faucet is supported.

The invention embodies, among other features, a faucet which can be easily operated; which consists of few parts, which parts cannot readily get out of order, and which, by its construction and arrangement, permits of quickly opening or quickly shutting off the flow of fluid from the casing of the faucet.

In the further disclosure of the invention reference is to be had to the accompanying drawings, constituting a part of this specification, in which similar characters of reference denote corresponding parts in all the views, and in which:

Figure 1 is a fragmentary sectional view of the faucet showing the valve in closed position; Fig. 2 is a similar view showing the valve in open position; Fig. 3 is a vertical transverse sectional view taken on the line 3—3 in Fig. 2; and Fig. 4 is a perspective view of the tubular member.

Referring more particularly to the views, I provide a casing 10 having an end 11 for connection with a supply pipe terminating in an inlet passage 13 to a valve chamber 14 formed in the casing 10, the other end of the passage 12 terminating in the end 11 of the casing. The casing also includes a passage 15 formed in an end 16 thereof and terminating at the inner end in an auxiliary chamber 17 forming a part of the valve chamber 14.

Mounted to slide in the valve chamber 14 is a valve 18 consisting of a stem $18^a$ terminating at one end in a head $18^b$ and encircled by suitable packing members $18^c$ and between which is interposed a sleeve $18^d$ encircling the stem $18^a$, a second sleeve $18^e$ being arranged on the stem $18^a$ and interposed between the packing member $18^c$ and a third packing member $18^f$ carried on the stem $18^a$ with a nut 19 having threaded connection with the stem and engaging the packing member $18^f$ to hold the sleeve $18^e$ and the sleeve $18^d$ in rigid position on the stem, it being understood that the arrangement of the sleeve $18^d$ and packing members $18^c$ provides an annular channel 20 within the valve chamber 14.

A tubular member 21 is arranged in one end of the casing 10 and has an end thereof provided with a series of spaced projections 22, thus forming a series of ports 23 between the projections, the said tubular member being arranged in the casing so that the ports 23 will lie in the auxiliary chamber 17 as shown. The valve 18 is adapted to operate in the valve chamber 14 and in the tubular member 21 and, therefore, a link 24 has pivotal connection with the outer end of the stem and is also pivotally connected with a lever 25 carrying a suitable handle 26, the said lever being mounted to swing on an ear 27 formed with the casing 10. Now it will be apparent that when the valve is in the position shown in Fig. 1 the fluid in the supply passage 12 will be prevented from entering the outlet passage 15 inasmuch as the annular channel 20 is out of registration with the ports 23 and the outlet passage 15, the said fluid in the passage 12, however, being adapted to pass through the passage 13 and into that portion of the valve chamber indicated by the channel 20. Now when the lever 25 is actuated to move the valve into open position as shown in Fig. 2, it will be seen that the channel 20 will register with the passage 13 and with the ports 23 which communicate with the passage 15 so that the fluid in the supply passage 12 can pass through the passage 13 into the valve chamber and thence through the ports 23 into the passage 15, the said fluid being adapted to pass from the valve chamber into the auxiliary chamber 17 and through the ports 23 of the tubular member 21 from which it will pass directly through the outlet passage 15.

From the foregoing description it will be apparent that the valve described herein is of a quick opening and quick closing nature and wherein the supply of fluid from the passage 12 to the passage 15 can be cut off as quickly as it can be established. It should be particularly noted that the faucet described herein embodies few and simple parts which can be readily manufactured of material of great durability and further-more that the valve in its entirety embodies a structure which will not easily wear out and which cannot easily bind in the casing.

A longitudinal passage 19ª is formed in the valve stem 18ª to communicate with the interior of the casing so that when the valve 18 is actuated to be moved backward and forward in the casing any air which may back up within the casing back of the valve will be forced outwardly through the passage 18ª, thus permitting the valve to be easily operated without any back pressure.

Having thus described my invention, I claim:

1. In a faucet, the combination with a casing including a valve chamber having inlet and outlet passages communicating therewith and an auxiliary chamber communicating with the valve chamber and said outlet, of a valve mounted to slide in the valve chamber, comprising a stem, a packing member at one end of said stem, a second packing member mounted upon said stem, and a third packing member carried by said stem, a sleeve of lesser diameter than the valve chamber carried by said stem and disposed between the first and second mentioned packing members and providing such valve chamber with an annular channel, and a second sleeve mounted upon the stem and disposed between the second and third mentioned packing members, and a tubular member mounted within the valve chamber in embracing relation with the third mentioned packing member and said second mentioned sleeve and provided at one end with a series of ports adjacent the auxiliary chamber restricting the said outlet and through which said fluid is adapted to flow.

2. In a faucet, the combination with a casing including a valve chamber having inlet and outlet passages communicating therewith and an auxiliary chamber communicating with the valve chamber and said outlet, of a valve mounted to slide in the valve chamber, comprising a stem, a packing member at one end of said stem, a second packing member mounted upon said stem, and a third packing member carried by said stem, a sleeve of lesser diameter than the valve chamber carried by said stem and disposed between the first and second mentioned packing members and providing such valve chamber with an annular channel, and a second sleeve mounted upon the stem and disposed between the second and third mentioned packing members, and a tubular member of less length than the valve chamber mounted within the latter in embracing relation with the third mentioned packing member and said second mentioned sleeve and provided on its innermost end with a series of projections forming a series of ports between said projections for restricting the said outlet and through which the said fluid is adapted to flow, said projections and ports located adjacent said auxiliary passage.

In testimony whereof I affix my signature in presence of two witnesses.

MARTIN A. FORSTER.

Witnesses:
 LOUIS C. KELLER,
 W. I. HAMOR.